March 14, 1961 A. ZOLLINGER 2,974,915
MOTOR DRIVEN CONSTANT SUPPORT HANGERS
Filed Feb. 25, 1958 3 Sheets-Sheet 1

INVENTOR.
ALFRED ZOLLINGER
BY
David D. McKenney
ATTORNEY

March 14, 1961 A. ZOLLINGER 2,974,915
MOTOR DRIVEN CONSTANT SUPPORT HANGERS
Filed Feb. 25, 1958 3 Sheets-Sheet 2

INVENTOR.
ALFRED ZOLLINGER
BY
David D. McKenney
ATTORNEY

March 14, 1961 A. ZOLLINGER 2,974,915
MOTOR DRIVEN CONSTANT SUPPORT HANGERS
Filed Feb. 25, 1958 3 Sheets-Sheet 3

INVENTOR.
ALFRED ZOLLINGER
BY
David D. McKenney
ATTORNEY

United States Patent Office 2,974,915
Patented Mar. 14, 1961

2,974,915

MOTOR DRIVEN CONSTANT SUPPORT HANGERS

Alfred Zollinger, Providence, R.I., assignor to Grinnell Corporation, Providence, R.I., a corporation of Delaware Filed Feb. 25, 1958, Ser. No. 717,486

3 Claims. (Cl. 248—58)

This invention relates to improvements in motor driven constant support hangers for supporting loads subject to vertical movement within a limited range. More particularly, it has to do with such a hanger having a motor and a motor control which is responsive to apparent changes in the load on the hanger to cause the motor to move the load in a direction and by an amount indicated by each such apparent load change and which includes a system of levers whereby a small force balances the load and whereby small apparent changes in the load produce relatively large movements at the point where the small force is exerted.

In general motor-driven constant support hangers employ a frame, a screw member vertically disposed on the frame, and nut member threaded on the screw member, a motor rotating one of these members and an element connecting the load to the other member whereby rotation of the one member by the motor causes the other member to move vertically and thereby move the load.

If the load is a pipe section in a piping system and is subject to vertical movement within a limited range as a result of thermal expansion and contraction of the piping material, such thermal movement produces an apparent change in the load exerted on the vertically movable member. For example, if a change in the temperature of the piping system causes the pipe section to move downwardly the load exerted by the weight of this section is apparently increased. Similarly if a change in temperature of the piping system causes the pipe section to move upwardly the load exerted by the weight of this section is apparently decreased.

In prior devices of this general type these apparent changes in weight have been employed to control the motor by causing the motor to drive the movable member in the direction indicated. More particularly, a conventional helical spring has been provided between the movable member and the load. The entire weight of the load plus any apparent increases in this weight have been customarily borne by this spring, and a spring which will thus yieldably support the entire weight of the load without exceeding allowable stress of the spring material and which will provide a significant deflection upon slight apparent changes in the weight of the load must be very large and occupy considerable space.

This disadvantage has been overcome in the present invention by employing a system of levers providing a mechanical disadvantage so arranged that very slight forces applied at one point in the system will balance the load and any apparent changes therein. In this manner instead of having the entire weight of the load supported by a spring member, the largest portion of the load is supported by the fulcrums of the system and only a small portion is carried at the point where the small force is applied. Another advantage of this arrangement is that small apparent changes in the weight of the load due to thermal movement of the piping will produce significant movements of the point where the small force is applied, and such significant movements may therefore be employed to operate suitable switching mechanisms for controlling the operation of the motor to compensate for the apparent increases or decreases in load.

Accordingly, it is one object of the present invention to provide a motor-driven hanger in which there is provided between fixed structure and the load a system of mechanical levers providing a mechanical disadvantage whereby the application of a relatively small force at one point in the system will maintain the system in equilibrium against the weight of the load at another point in the system.

Another object of the invention is to provide a motor-driven constant support hanger as described wherein the small force referred to is exerted by a spring.

Another object of the present invention is to provide a motor-driven constant support hanger of the kind described wherein the small force is provided by a counterweight.

Another object of the present invention is to provide a motor-driven constant support hanger of the kind referred to wherein the appreciable movement of the point in the leverage system at which the small force is applied is employed to operate a switching mechanism for controlling the motor of the hanger.

Other objects will appear hereinafter.

The accompanying drawings show and the following specification describes preferred embodiments of the present invention. These are merely illustrative of the invention, however, for it is not intended that the invention be limited to these embodiments.

Figure 1:
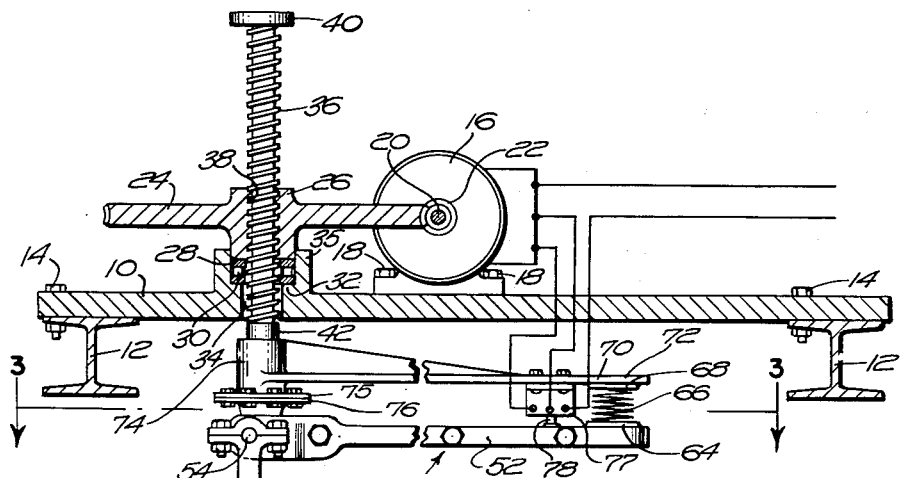
Fig. 1 is a front elevation view of a preferred form of the present invention showing the devices supporting a suspended load.
Figure 2:
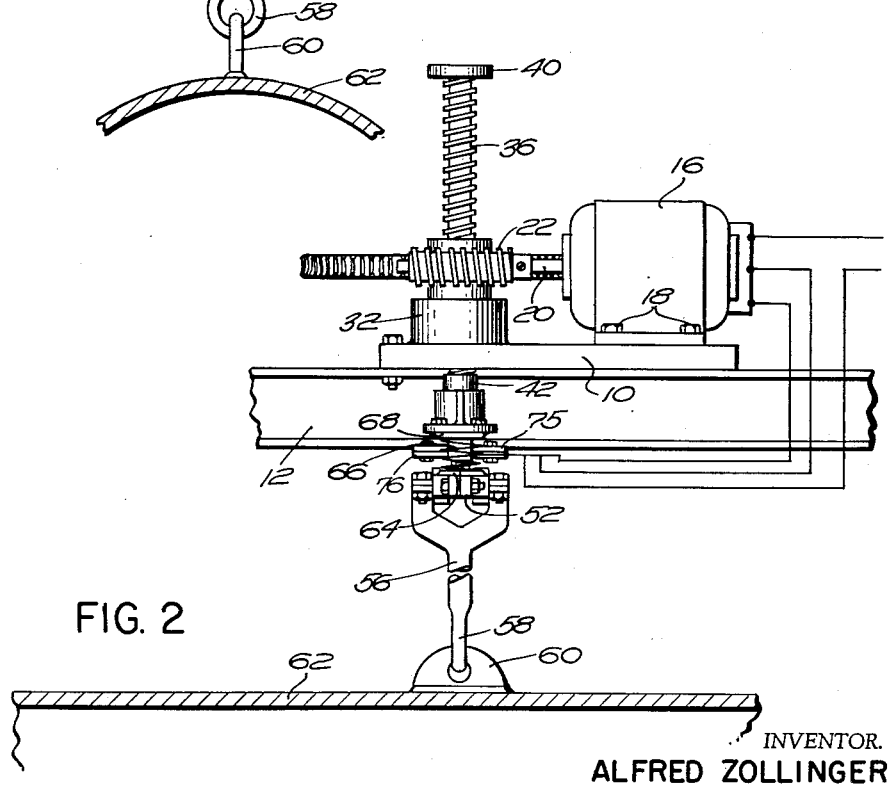
Fig. 2 is a side elevation view of the arrangement shown in Fig. 1.
Figure 3:
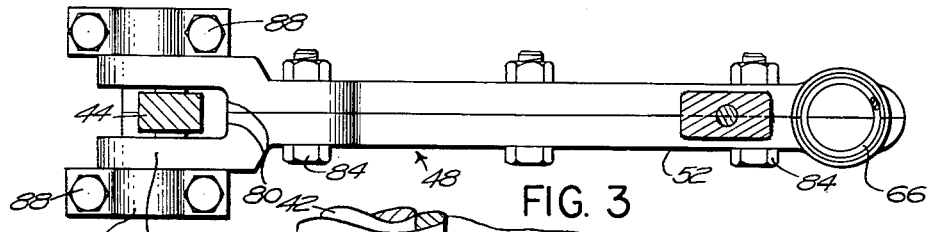
Fig. 3 is a cross sectioned plan view taken on line 3—3 of Fig. 1.

Referring now more particularly to Fig. 1 the motor-driven hanger there shown comprises a frame member 10 resting on building frame members 12 and preferably secured thereto by bolt and nut assemblies 14. A reversible electric motor 16 is mounted on the upper surface of the frame 10 and is secured thereto in a convenient fashion, for example, by bolt and nut assemblies 18. This motor has a drive shaft 20 provided on its end with a worm gear 22 which meshes with a worm wheel 24 having its axis of rotation disposed generally vertically. More particularly, this worm wheel 24 has a hub portion 26 having its under face 28 resting on a roller thrust bearing 30 which in turn rests upon a boss 32 formed in the upper surface of the frame 10 and surrounding an opening 34 in this frame. An upstanding lip 35 around the boss centers the roller thrust bearing and worm wheel hub with respect to the opening 34. A screw member 36 passes through this opening 34 and the annular thrust bearing 30 with clearance and is threadedly engaged in a threaded opening 38 in the worm wheel 34. The upper end of the screw member 36 is provided with a stop 40 to prevent accidental turning of the screw member completely through the worm wheel opening 38.

By the arrangement thus far described it will be apparent that rotation of the worm gear 22 by the motor 16 will in turn rotate the worm wheel 24 and cause the screw member 36 to move vertically with respect to the frame 10.

The lower end of the screw member is provided with a vertically downwardly extending cylindrical unthreaded portion 42 which has a section 44 at its lower end. (See Fig. 4.) This section has a hole 45 therethrough which is substantially at right angles to and intersects the axis of the screw member and which receives a pivot pin 46 on the ends of which there is pivoted a bifurcated lever 48 having a short arm 50 and a long arm 52. The short arm 50 extends from the axis of the pivot pin 46 in a generally horizontal direction (to the left in Fig. 4) and is provided with a pair of trunnions 54 extending outwardly from its outer sides.

These trunnions 54 are received in journals on the upper ends of a bifurcated load engaging rod 56, the lower end of which is provided with an eye 58 engaging a bracket 60 welded to a pipe section 62 comprising the load for the hanger. The long arm 52 of the lever extends from the axis of the pin 46 in a substantially horizontal direction (to the right in Fig. 4) opposite to the short arm and is provided at its end with an upstanding annular lip 64 adapted to fit into and retain the lower end of a vertically disposed compression spring 66 the upper end of which is retained by a similar lip 68 formed on the outer end 70 of a bracket 72 the other end 74 of which encircles the portion 42 of the screw member and has a flange 75 bolted to a corresponding flange 76 on this portion. By this arrangement the spring 66 when compressed, exerts a downward force on the end of the long lever arm 52 to counterbalance the weight of the load 62 acting on the short arm of this lever. The outer end 70 of the bracket 72 which is engaged by the spring 66 also serves as a mounting for a switch mechanism 77 having a plunger 78 extending down therefrom and engaging the upper surface of the long arm 52 of the lever.

Figure 4:
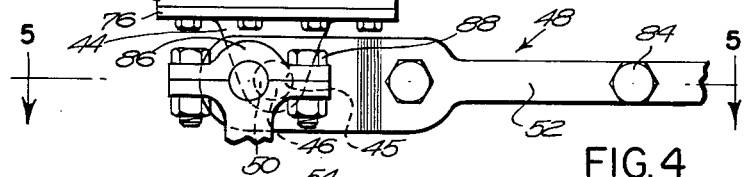
Fig. 4 is an enlarged side elevation view of a portion of the device of Fig. 1.
Figure 5:
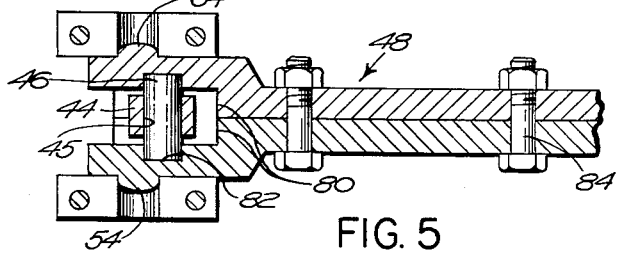
Fig. 5 is a cross sectioned plan view taken on line 5—5 of Fig. 4.

As shown in Figs. 4 and 5 the lever 48 is preferably formed in two parts so that the trunnions 54 may have their axis a distance away from the axis of the pin 46 which is less than the diameters of the trunnion pins. Thus each half of the lever 48 is formed with a step 80 so that when the two halves are put together a bifurcated lever results. The inner faces of these two halves are each also provided with a blind hole 82 to receive one end of the pin 46 when the two halves are secured together by bolt and nut assemblies 84. The section 44 of the screw member carries the pin 46 and fits between the bifurcated lever ends. The upper end of the bifurcated load connecting rod 56 is so arranged with cap portions 86 secured to the main portions by bolt and nut assemblies 88 that the upper end of the rod 56 may be readily pivotally secured to the fixed trunnions 54.

The operation of the device of Figs. 1 to 5 is as follows: Assume that the pipe section 62 is a horizontally extending section in a piping system in which there are also vertical risers that expand and contract with increases and decreases of temperature and cause this horizontal section 62 to move vertically upwardly and downwardly. Further assume that a change in temperature is currently taking place which causes the section 62 to move downwardly. The pitch of the threads on the screw member 36 is so slight that the downward force exerted by the pipe section 62 is unable to drive the worm wheel 24 and the motor 16, and, accordingly, when the motor is turned off there is effectively a rigid connection between the building frames 12 and the pipe section 62. However, attempted downward movement of the section 62 due to the temperature change produces an increase in the force exerted on the connecting member 56. This in turn rotates the member 48 in a counter-clockwise direction (see Fig. 1) and causes the spring 66 to be compressed more than is shown in Fig. 1. It is assumed that prior to this movement of the pipe section 62 the force exerted by the spring 66 on the long arm 52 of the lever was just sufficient to maintain this lever in the position shown against the weight of the load acting on the short arm 50. The apparent increase in load weight causes the spring 66 to be compressed somewhat more and when this increase in compression reaches a predetermined amount, indicating for example that the weight of the pipe section has apparently increased by some predetermined amount, for example about 1%, the plunger 78 is moved upwardly a sufficient distance to actuate the switch mechanism 77 and turn on the motor 16 to drive the screw member 36 downwardly in the direction in which the load 62 wants to go. The rate of movement of the screw member 36 is greater than the pipe movement which is due to thermal changes, and accordingly operation of the motor 16 quickly causes the increased force on the connecting member 56 to disappear, and the result is that the spring 66 soon returns the lever to the position (relative to bracket 72) shown in the drawings, at which point the plunger 78 operates the switch mechanism 77 to turn off the motor 16 and stop the downward movement of the screw member 36.

Similarly if the changes in the temperature of the piping system are such as to cause the pipe section 62 to move upwardly the effect of this is to decrease the force exerted by the pipe section on the connecting member 56 so that the force exerted by the compressed spring 66 rotates the lever 48 in a clockwise direction, and when the lever 48 has rotated far enough in a clockwise direction to indicate a decrease in the force exerted on the connecting member 56 of some predetermined amount, for example approximately 1% of the actual weight of the pipe section 62, then the motor is turned on in the opposite direction to drive the screw upwardly. This upward movement of the screw 36 promptly increases the force exerted on the connecting member 56 and rotates the lever in a counter-clockwise direction until it is returned to the position shown in Fig. 1, at which position the switch mechanism again turns off the motor 16.

Thus, by the use of a large mechanical disadvantage a relatively light spring 66 is employed to balance a heavy load, and while the changes in this load will not cause appreciable movement of the load with respect to fixed members such as building frame members 12 there is appreciable movement of the other end of the lever because of the mechanical disadvantage, and this movement can be employed to operate a switch to control the motor. In fact, appreciable movement of the part of the lever which operates the switch is a distinct advantage because it enables the use of a switch which requires large movement and therefore makes it unnecessary to use delicate switches such as the so-called "microswitches." As a result switches of heavy construction capable of carrying relatively heavy motor currents can be employed for the switch 77, and it is unnecessary to have additional switches which carry the motor current operated by switch 77. Similarly this appreciable movement permits small switch adjustments to be made accurately.

The embodiment of Figs. 6 to 9 shows how a special lever may be employed which does not need a spring 66 as in Fig. 1. In this arrangement there is a similar frame 90 resting on, and preferably secured to, building frame members 92 and having secured to its upper surface a reversible motor 94 having a shaft 96 provided on its end with a worm gear 98. This worm gear engages a worm wheel 100 having a hub portion 102 the underface 104 of which rests upon annular roller thrust bearing 106 which in turn surrounds an opening 108 in the frame 90. An upstanding lip 110 retains the roller thrust bearing and worm wheel hub in concentric relation with respect to the opening 108. A screw member 112 passes with clearance through both the roller thrust bearing 106 and opening 108 and is threadedly engaged in an opening 114 through the worm wheel hub 102. The upper end of this screw member 112 is provided with a stop 116 to prevent accidental movement of the screw member completely through the worm wheel opening 114. The lower end of the screw member 112 has an off-set portion 118 which carries a pivot pin 120 with its ends journaled in the bifurcated portions 122 of a lever 124.

The arrangement thus far described is substantially identical to that of Figs. 1 to 5 except for the lever 124. This lever has a long arm 126 extending substantially horizontally, as in the arrangement of Figs. 1 to 5, but the short arm 128 which comprises the ends of the bifurcated portions 122 extends generally downwardly from the axis of the pivot pin 120 rather than in the horizontal direction opposite to the long arm. The load is pivotally connected to the short arm at a pivot pin 130 which also has its ends journalled in the bifurcated portions of the lever.

Thus the short arm 128 extends at an angle (measured clockwise in Fig. 6) with respect to the long arm which is somewhat greater than 90°. For example, in the embodiment shown in Fig. 6 when the long arm 126 is exactly horizontal the axis of the pivotal connection of the load to the short arm at pivot pin 130 is not exactly vertically below the axis of the pivot pin 120 but instead is below and slightly to the left of that axis. More particularly, the load 132 (which is again a horizontally extending section of a pipe in a piping system) is provided with a bracket 134 to which there is secured the lower end 136 of a load connecting rod 138, the upper end of which is provided with an eye 140 encircling the pin 128.

At the outer end of the longer lever arm 126 there is provided a threaded portion 141 having threaded thereon a weight 142 which is provided with a sharp edge 144 circumferentially disposed there-around and two nuts 146 which serve to hold the weight 142 in a selected position on the threaded rod 141. A switch 148 having a plunger 150 engaging the upper surface of the long arm 126 is secured in a suitable manner to the one end 152 of a bracket member 154, the other end 156 of which is secured to the lower unthreaded portion of the screw member 112. Extending from the bracket member in a direction substantially parallel to the threaded portion 141 of the long arm is a scale 158 with markings thereon which indicate the position of the sharp edge 144 of the weight 142 on this threaded rod 141. This scale may be calibrated to indicate the load being supported as will more fully appear from the description hereinafter. This scale 158 is pivoted at 159 so that it can be folded back out of the way of the weight 142.

Figure 6:
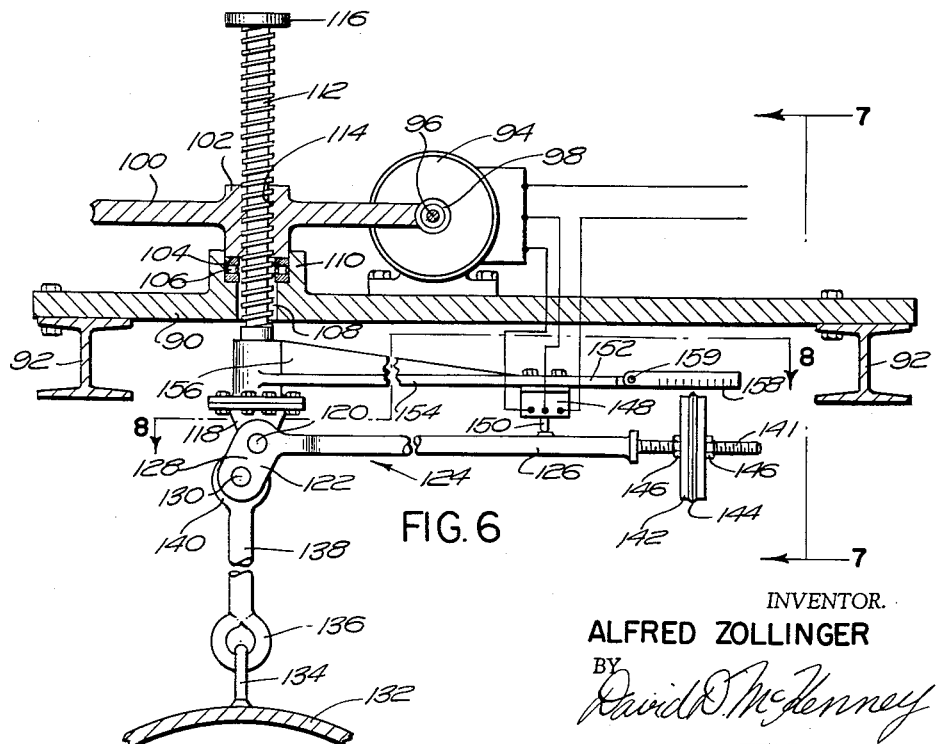
Fig. 6 is a sectioned front elevation view of another embodiment of the present invention.
Figure 7:
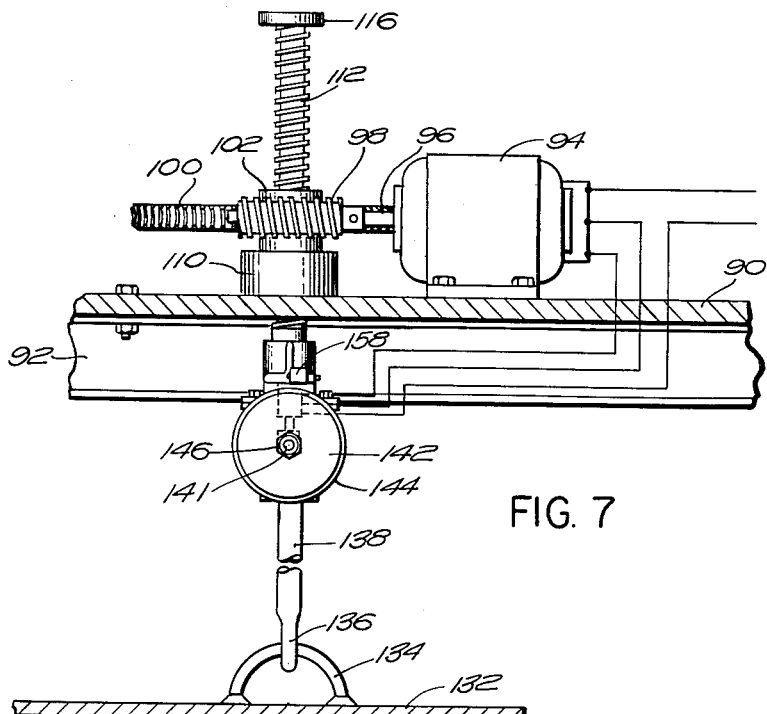
Fig. 7 is a side elevation view of the embodiment shown in Fig. 6.
Figure 8:
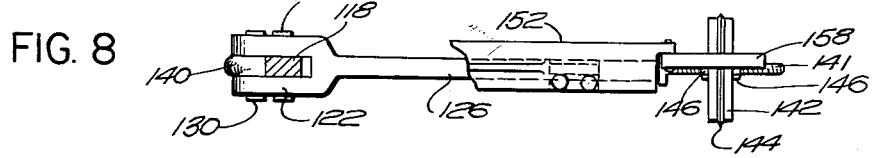
Fig. 8 is a plan view taken on line 8—8 of Fig. 6.
Figure 9:
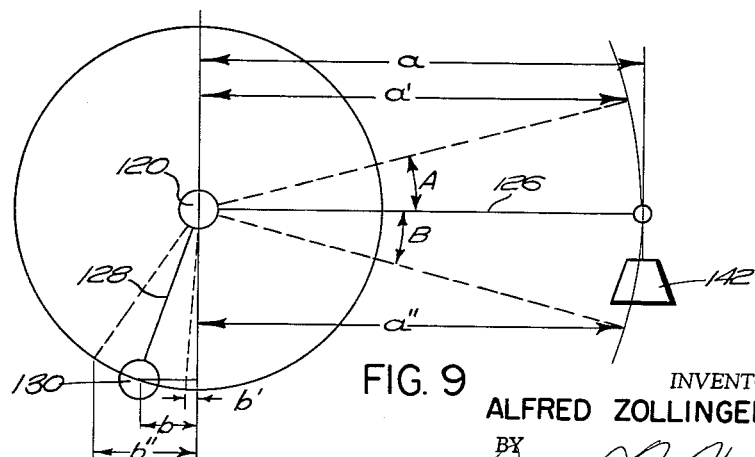
Fig. 9 is a diagrammatic view of a portion of the device of Figs. 6, 7 and 8 further illustrating its operation.

Fig. 9 is a diagrammatic showing of the lever of Fig. 6 which demonstrates how this embodiment of Fig. 6 operates without the use of a spring like the spring 66 in the embodiment of Fig. 1. Thus for a given arcuate movement of the lever 124 from its position with the long arm horizontal (for example counter clockwise through angle A) the effective moment arm of the weight 142 about the axis of the pivot pin 120 does not change substantially with respect to the moment arm before such movement. Such moment arm before this rotation is indicated by the distance $a$ and after this rotation by the distance $a'$. However, for this same rotation of the lever the effective moment arm of the load about the axis of pivot pin 120 changes substantially with respect to the moment arm before such movement. Distances $b$ and $b'$ designate the moment arm before and after such movement. Assuming that the thermal expansion of the system causes the pipe section 132 to move downwardly this would increase the force exerted downwardly by the load on the pivot pin 130. The weight 142 multiplied by its moment arm $a$ would then be less than the increased force multiplied by its moment arm $b$ and the lever would move counterclockwise to a new position. This new position would be that at which weight 142 multiplied by its new moment arm $a'$ equals the increased load force multiplied by its new moment arm $b'$. Because the moment arm $b$ of the load decreases very rapidly with rotation while the moment arm $a$ of the weight 142 hardly changes a new equilbrium is established for the increased load force after a very small rotation of the lever.

Similarly, assuming that the temperature change in the piping system causes the pipe section 132 to move upwardly this would decrease the apparent load on the pivot pin 130, but this decreases while allowing the weight 142 to rotate the lever in a clockwise direction a small amount would not allow very much rotation because even a slight clockwise rotation from the position shown in Fig. 6 (for example through angle B) would cause a rapid increase in the effective moment arm of the load from $b$ to $b''$. A new equilibrium would be established after a small rotation of the lever, but such rotation is enough to actuate the switch 148 to operate the motor 94 to increase the load on the pivot pin 130 and return the long arm of the lever to its horizontal position.

I claim:

1. A constant support pipe hanger for exerting a predetermined weight-supporting force on a pipe which is moved through a limited range of movement with respect to fixed structure in a vertical first direction by thermal expansion and contraction forces, said pipe hanger comprising a frame adapted to be secured to said fixed structure, a motor, a jack driven by said motor having a first portion mounted on said frame and having a second portion engaged with said first portion and movable with respect thereto for varying the position of said second jack portion with respect to said frame, a lever pivotally connected to said second jack portion for rotation about a pivot, said lever having first and second points thereon spaced from said pivot and forming therewith first and second lever arms, respectively, means for securing said frame to said fixed structure, a pipe supporting member connected to said first lever point, means for connecting said pipe supporting member to said pipe, said first lever arm extending at an angle to said vertical direction when said frame is secured to said fixed structure and said pipe supporting member is connected to said pipe, whereby the weight of said pipe together with any of said vertical forces produces a turning moment on said lever about said pivot, a spring connected between a third point on said movable second jack portion and said second lever point and exerting a spring force substantially along the line defined by said second and third points, said line being at a substantial angle to said second lever arm and in a direction which causes said spring force to produce an opposite turning moment on said lever about said pivot, said spring having its deflection and force increased with rotation of the lever caused by downward movement of the pipe, said lever having a rotative equilibrium position in which the spring force moment equals the pipe weight moment and being rotated from said equilibrium position by said vertical forces exerted on the pipe, and a motor switch mounted on said second jack portion and engaging said lever at a fourth point thereon substantially farther from said pivot than the length of said first lever arm, said motor switch being actuated by said rotation of said lever from said equilibrium position, said second lever arm having a substantially greater length than said first lever arm, and said spring force for said equilibrium lever position being substantially less than said pipe weight.

2. A constant support pipe hanger for exerting a predetermined weight-supporting force on a pipe which is moved through a limited range of movement with respect to fixed structure in a vertical first direction by thermal expansion and contraction forces, said pipe hanger comprising a frame adapted to be secured to said fixed structure, a motor, a jack driven by said motor having a first portion mounted on said frame and having a second portion engaged with said first portion and movable with respect thereto for varying the position of said second jack portion with respect to said frame, a lever pivotally connected to said second jack portion for rotation about a pivot, said lever having first and second points thereon spaced from said pivot and forming therewith first and second lever arms, respectively, means for securing said frame to said fixed structure, a pipe supporting member connected to said first lever point, means for connecting said pipe supporting member to said pipe, said first lever arm extending at an angle to said vertical direction on one side of said pivot when said frame is secured to said fixed structure and said pipe supporting member is connected to said pipe, whereby the weight of said pipe together with any of said vertical forces produces a turning moment on said lever about said pivot, a counter weight connected to said second point on said lever, said second lever arm extending at a greater angle to said vertical direction on the opposite side of said pivot when said frame is secured to said fixed structure and said pipe supporting member is connected to said pipe, whereby the weight of said counter-weight produces an opposite turning moment on said lever about said pivot, said lever having a rotative equilibrium position in which the counterweight moment equals the pipe weight moment and being rotated from said equilibrium position by said vertical forces exerted on the pipe, and a motor switch mounted on said second jack portion and engaging said lever at a point thereon substantially farther from said pivot than the length of said first lever arm, said motor switch being actuated by said rotation of said lever from said equilibrium position, said second lever arm having a substantially greater length than said first lever arm, and said counter weight being substantially less than said pipe weight.

3. A constant support pipe hanger for exerting a predetermined weight-supporting force on a pipe which is moved through a limited range of movement with respect to fixed structure in a vertical first direction by thermal expansion and contraction forces, said pipe hanger comprising a frame adapted to be secured to said fixed structure, a motor, a jack driven by said motor having a first portion mounted on said frame and having a second portion engaged with said first portion and movable with respect thereto for varying the position of said second jack portion with respect to said frame, a lever pivotally connected to said second jack portion for rotation about a pivot, said lever having first and second points thereon spaced from said pivot and forming therewith first and second lever arms, respectively, means for securing said frame to said fixed structure, a pipe supporting member connected to said first lever point, means for connecting said pipe supporting member to said pipe, said first lever arm extending at a first angle to said vertical direction when said frame is secured to said fixed structure and said pipe supporting member is connected to said pipe, whereby the weight of said pipe together with any of said vertical forces produces a turning moment on said lever about said pivot, means for exerting force on said second lever point at a substantial angle to said second lever arm and in a direction which produces an opposite turning moment on said lever about said pivot, said second lever arm extending at a second larger angle to said vertical direction when said frame is secured to said fixed structure and said pipe supporting member is connected to said pipe, said lever having a rotative equilibrium position in which the moment of said force exerting means equals the pipe weight moment and being rotated from said equilibrium position by said vertical forces exerted on the pipe, and a motor switch mounted on said second jack portion and engaging said lever at a third point thereon substantially farther from said pivot than the length of said first lever arm, said motor switch being actuated by said rotation of said lever from said equilibrium position, said second lever arm having a substantially greater length than said first lever arm, and the force exerted by said force exerting means in said equilibrium lever position being substantially less than said pipe weight.

References Cited in the file of this patent

UNITED STATES PATENTS

| 2,107,888 | Dean | Feb. 8, 1938 |
| 2,248,730 | Wood | July 8, 1941 |
| 2,313,638 | Granditz | Mar. 9, 1943 |
| 2,705,168 | Cody | Mar. 29, 1955 |
| 2,842,629 | Skinner | July 8, 1958 |
| 2,879,708 | Cripe | Mar. 31, 1959 |